(12) United States Patent  (10) Patent No.: US 8,002,096 B2
Shirataki et al.  (45) Date of Patent: Aug. 23, 2011

(54) ONE-WAY CLUTCH OF ROLLER TYPE

(75) Inventors: Hirobumi Shirataki, Fukuroi (JP);
Tomoharu Ando, Fukuroi (JP); Shinya Okuma, Fujuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 12/617,807

(22) Filed: Nov. 13, 2009

(65) Prior Publication Data
US 2010/0116611 A1  May 13, 2010

(30) Foreign Application Priority Data

Nov. 13, 2008 (JP) ................................. 2008-291036

(51) Int. Cl.
*F16D 41/067* (2006.01)
(52) U.S. Cl. ........................................ 192/45; 192/89.2
(58) Field of Classification Search ................... 192/89.2
See application file for complete search history.

(56) References Cited

U.S. PATENT DOCUMENTS

| | | | |
|---|---|---|---|
| 3,656,591 A | | 4/1972 | Marland et al. |
| 4,932,508 A | * | 6/1990 | Lederman .................... 192/45 |
| 5,279,400 A | * | 1/1994 | Riggle et al. .................... 192/45 |
| 5,328,010 A | * | 7/1994 | Lederman ........................ 192/45 |
| 2004/0139743 A1 | | 7/2004 | Sato |
| 2005/0034951 A1 | * | 2/2005 | Takasu ............................ 192/45 |
| 2007/0246318 A1 | | 10/2007 | Shirataki et al. |
| 2009/0242346 A1 | * | 10/2009 | Kinoshita ........................ 192/45 |
| 2010/0258398 A1 | * | 10/2010 | Shirataki et al. ................. 192/45 |

FOREIGN PATENT DOCUMENTS

| | | |
|---|---|---|
| JP | 08-061192 A | 3/1996 |
| JP | 2003-172377 A | 6/2003 |
| JP | 2004-346951 A | 12/2004 |
| JP | 2007-064475 A | 3/2007 |

\* cited by examiner

*Primary Examiner* — Richard M. Lorence
(74) *Attorney, Agent, or Firm* — Miles & Stockbridge P.C.

(57) ABSTRACT

The present invention provides a one-way clutch comprising an outer race, an inner race, a roller adapted to transmit torque between the outer race and the inner race, a cage having a window for holding the roller, a spring disposed in the pocket between the outer race and the roller and adapted to bias the roller toward an engagement direction with respect to the cam surface and having one end and the other end which include tab portions bent non-straightly from a main body portion, one of the tab portions being locked to an axial end face of the outer race, the other tab portion being pinched between an axial end face of the roller and a flange portion of the cage, and wherein one end of the spring is secured to the outer race and the other end is engaged by the roller, and the one end and the other end are connected to the main body portion of the spring via bent portions, and the bent portions are provided with interference preventing portions for interfering the bent portions with the outer race and the roller, respectively.

7 Claims, 4 Drawing Sheets

ONE-WAY CLUTCH OF ROLLER TYPE

This application claims the benefit of Japanese Patent Application No. 2008-291036, filed Nov. 13, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed within the pocket and adapted to transmit torque between the outer peripheral track surface of the inner race and the inner peripheral cam surface of the outer race, and a spring disposed within the pocket between the outer race and the roller and adapted to bias the roller toward an engagement direction with respect to the cam surface.

With this arrangement, in the one-way clutch of roller type, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race via the cam mechanism only in an opposite direction.

An example of a spring used in such a one-way clutch of roller type is shown in FIG. 8. FIG. 8 is a view similar to a sectional view taken along the line 5-5 of FIG. 4.

As shown in FIG. 8, one end and the other end of a spring 55 are constituted by tab portions 65 and 66 bent with respect to a main body portion 77, respectively, and the tab portion 65 is locked to an axial end face 72 of an outer race 51 and the tab portion 66 is pinched between an axial end face of a roller 53 and a flange portion (not shown) of a cage.

Here, a bent portion i.e. connection portion 75 between the tab portion 65 and the main body portion 77 is provided to abut against an edge portion of the outer race 51 and a connection portion 76 between the tab portion 66 and the main body portion 77 is provided to abut against an edge portion of the roller 53.

In this way, when the connection portions abut against associated members such as the outer race and roller to interfere with the associated members, during an operation of the one-way clutch, unnecessary forces are applied to the connection portions, with the result that the connection portions may be damaged due to fatigue or prematurely damaged due to wear and a smooth movement of the roller may be obstructed, thereby reducing reliability of the one-way clutch.

Further, in the one-way clutch of roller type, to obtain positive engagement, the roller as a torque transmitting member and the spring for biasing the roller must be prevented from being dislodged from the pocket in an axial direction and a radial direction.

For example, in a one-way clutch used as a starter of a motor bike, as disclosed in Japanese Patent Application Laid-open No. 2007-064475, it has been proposed to provide side plates on both sides of an outer race to prevent dislodgement of roller and spring.

In the conventional one-way clutch of roller type, since the connection portions between the tab portions and the main body portion of the spring abut against the associated member such as the outer race and roller to interfere with the associated members, during the operation of the one-way clutch, the unnecessary forces are applied to the connection portions, with the result that the connection portions may be damaged due to the fatigue or prematurely damaged due to the wear and the smooth movement of the roller may be obstructed, thereby reducing the reliability of the one-way clutch.

On the other hand, as disclosed in the above-mentioned Japanese Patent Application Laid-open No. 2007-064475, it was necessary to provide the side plates on both axial sides of the outer race to prevent the dislodgement of the roller and the spring. Further, in a condition before the one-way clutch is mounted on the inner race, there must be provided separately means for dislodging the roller and the spring in a radial direction. In any cases, it is difficult to reduce the cost of the clutch.

Accordingly, it is desired to provide a one-way clutch of roller type which has enhanced reliability in engagement and idle rotation of the one-way clutch and can reduce the cost in comparison with conventional clutches and which includes means for preventing roller and spring from being dislodged.

SUMMARY OF THE INVENTION

Thus, an object of the present invention is to provide a one-way clutch of roller type which achieves enhanced reliability by arranging a spring for biasing a roller in such a manner that connection portions between a main body portion and tab portions do not interfere with associated members and to reduce reduction in cost by preventing dislodgement of the roller and the spring for biasing the roller without using side plates conventionally used to prevent the roller as a torque transmitting member and the spring for biasing the roller from being dislodged from a pocket in an axial direction and in a radial direction.

To achieve the above object, the present invention provides a one-way clutch of roller type comprising an annular outer race provided at its inner periphery with at least one pocket formed as a recessed portion including a cam surface and having a stepped portion formed on an inner diameter side of an axial one end face of the outer race; an inner race spaced apart from the outer race toward a radial inner diameter side of the outer race and coaxially arranged for a relative rotational movement and having an annular outer peripheral track surface; a roller disposed in the pocket and adapted to transmit torque between the outer peripheral track surface of the inner race and the inner peripheral cam surface of the outer race; and a spring disposed in the pocket and adapted to bias the roller toward an engagement direction with respect to the cam surface; and wherein one end of the spring is secured to the outer race and the other end of the spring is engaged by the roller, and the one end and the other end are connected to a main body portion via bent portions, respectively, and the bent portions are provided with interference preventing portions for preventing the ends from interfering with the outer race and the roller, respectively.

Further, preferably, in the one-way clutch of roller type according to the present invention, the spring is constituted by an accordion spring and the main body portion has a bellows shape, and the interference preventing portion is constituted by a curved portion curved outwardly from the bent portion.

In the one-way clutch of roller type according to the present invention, by arranging the connection portions (bent portions) between the tab portions (ends) and the main body portion of the spring in such a manner that the connection portions do not abut against the associated members such as the outer race and the roller, interference between the connection portions and the associated members can be avoided, with the result that the connection portions can be prevented from being damaged due to fatigue or being prematurely damaged due to wear and a smooth movement of the roller can be prevented from being obstructed (such damage and obstruction of the smooth movement may be caused by unnecessary force applied to the connection portions during the operation of the one-way clutch), thereby providing a one-way clutch of roller type having enhanced reliability.

In addition, the roller is prevented from being dislodged from the cage in the axial direction and the inner diameter direction by means of the outer race and a cage including a flange portion positioned at an axial one end of the pocket and a substantially rectangular window having a circumferential width smaller than a diameter of the roller in the circumferential direction and passing through the cage in the radial direction and closed at both ends in the axial direction (i.e. window encircled at its four sides so that the roller can be seated in the window).

Further, by fitting the flange portion of the cage in the stepped portion provided at the inner diameter portion of the end face of the outer race and by securing a generator and the like to the end face of the outer race near the flange portion, the cage is prevented from being dislodged.

Further, by securing one end of the spring to the end face of the outer race, the dislodgement of the spring is prevented.

Accordingly, since side plates required in the conventional one-way clutches of roller type can be omitted or eliminated, the cost can be reduced.

Further, by designing so that the cage can be rotated relative to the outer race, even when the circumferential window width of the cage is smaller than the diameter of the roller to prevent the dislodgement of the roller in the radial direction, since the cage does not obstruct the movement of the roller during the engaging operation of the one-way clutch and during the idle rotation, smooth engagement and idle rotation can be realized, and, regarding the movements of all rollers, the cage affords the synchronous action, thereby providing a one-way clutch of roller type having more enhanced engaging reliability.

Further features of the present invention will become apparent from the following description of an exemplary embodiment with reference to the attached drawings.

DETAILED DESCRIPTION OF THE INVENTION

Figure 1:
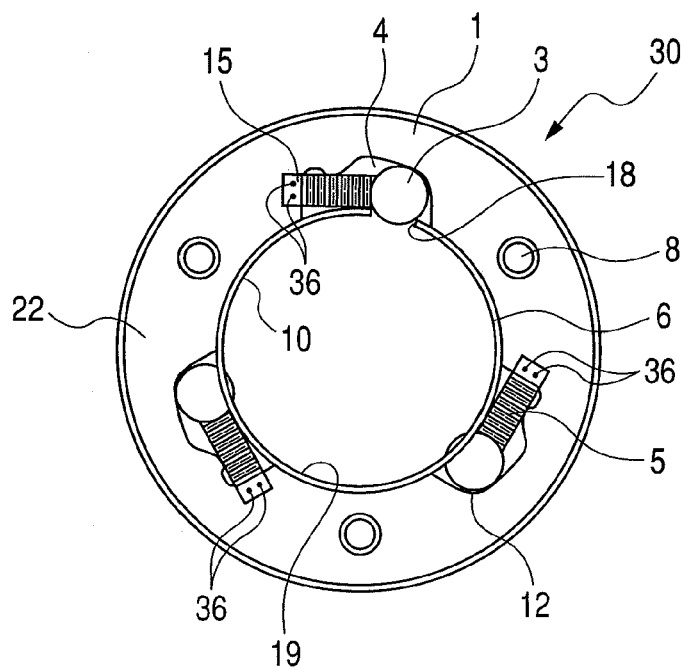
FIG. 1 is a front view showing a one-way clutch of roller type according to an embodiment of the present invention in a condition that the clutch is engaged under a high load.

Now, an embodiment of the present invention will be fully explained with reference to the accompanying drawings. Incidentally, the same reference numerals denote same or corresponding parts in the drawings. Further, it should be noted that the embodiment which will be described below is merely an example and other alterations and modifications can be made.

Figure 2:
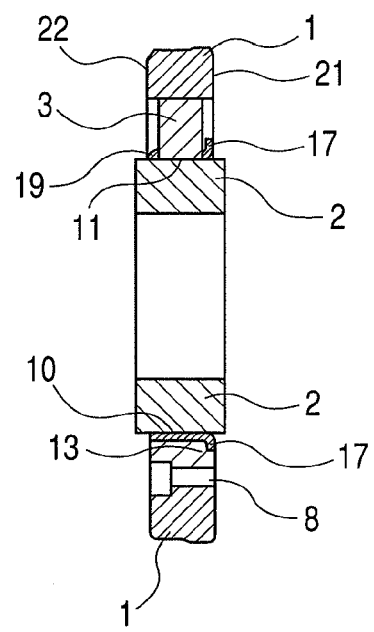
FIG. 2 is a sectional view taken along the line 2-O-2 of FIG. 3.
Figure 3:
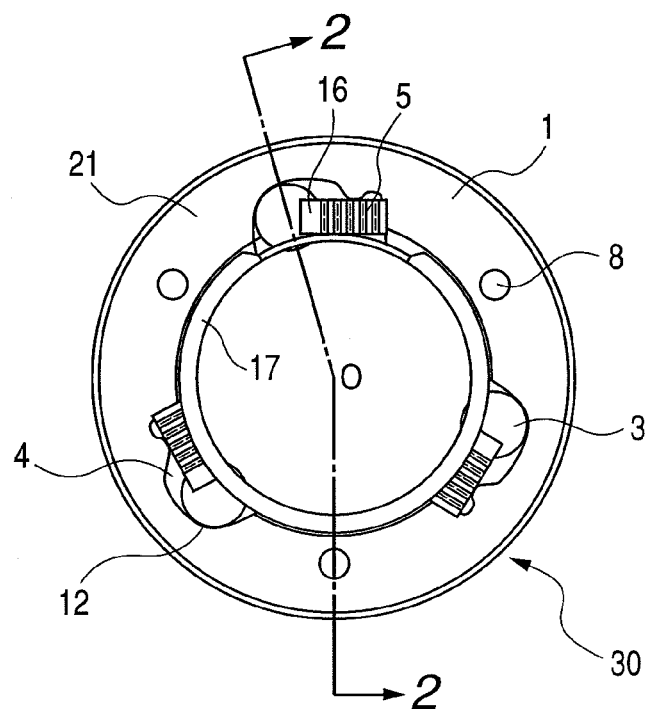
FIG. 3 is a front view looked at from a rear side of FIG. 1.

FIG. 1 is a front view showing a one-way clutch of roller type according to an embodiment of the present invention and FIG. 3 is a front view looked at from a rear side of FIG. 1. Further, FIG. 2 is a sectional view taken along the line 2-O-2 of FIG. 3.

FIGS. 1 to 3 show a condition that rollers are engaged by cam surfaces, i.e. a condition that a one-way clutch is engaged under a high load and is locked.

As shown in FIGS. 1 to 3, a one-way clutch 30 of roller type comprises an annular outer race 1 provided at its inner periphery with a plurality of pockets 4 formed as recessed portions having cam surfaces 12, an inner race 2 spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface 11 of the inner race 2 and the inner peripheral cam surfaces 12 of the outer race 1, springs 5 disposed in the respective pockets 4 and adapted to bias the rollers 3 toward engagement directions with respect to the cam surfaces 12, and a cage 6 for holding the rollers 3. The cage 6 is not secured to either the outer race 1 or the inner race 2, and, thus, can be rotated relative to the outer race 1 and the inner race 2.

Figure 7:
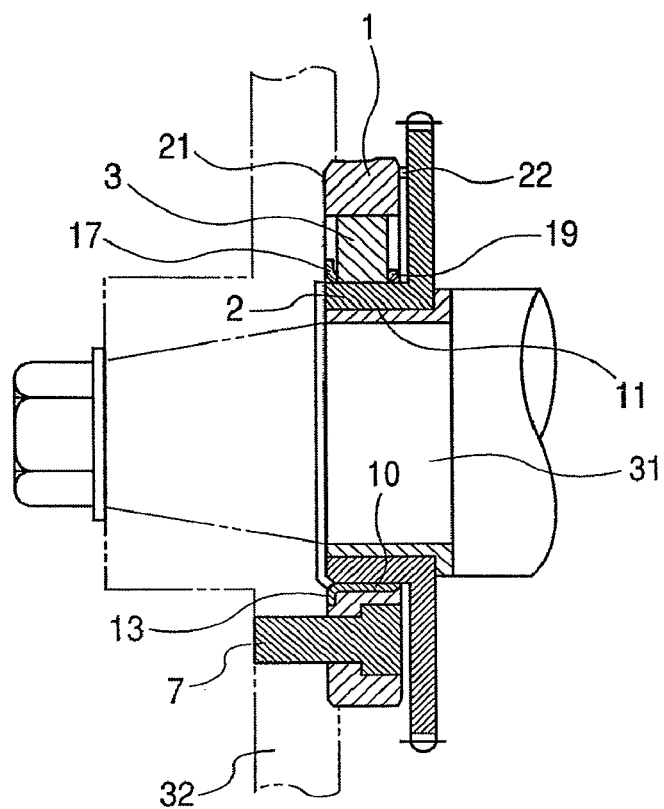
FIG. 7 is a schematic view of a power transmitting mechanism to which the one-way clutch of roller type according to the embodiment of the present invention is incorporated.
Figure 8:
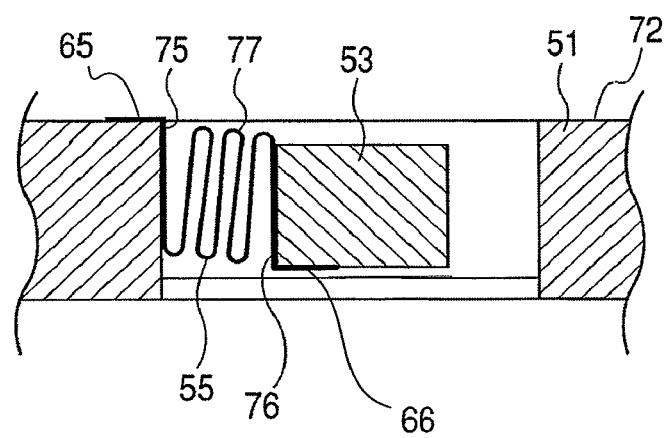
FIG. 8 is a sectional view showing a conventional pocket and therearound, taken along the line 5-5 of FIG. 4.

FIG. 7 is a schematic view showing a power transmitting mechanism to which the one-way clutch of the illustrated embodiment is incorporated. A crankshaft 31 is fitted in the inner race 2 of the one-way clutch 30 and a generator 32 is attached to an axial end face 21 of the outer race 1 by bolts 7.

A driving force from a starter motor (not shown) is transmitted to the crankshaft 31 by a cam mechanism of the one-way clutch 30.

In the illustrated embodiment, there are three pockets 4 provided in the outer race 1, which pockets are disposed equidistantly along a circumferential direction. Further, three bolt holes 8 used for securing the outer race 1 to the generator 32 and extending through the outer race in an axial direction are also disposed equidistantly along the circumferential direction, and the pockets 4 and the bolt holes 8 are arranged alternately and equidistantly. Of course, it should be noted that the number of the pockets 4 can be set to be plural, for example three to six, in accordance with the magnitude of the torque.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 3, the flange portion 17 is partially broken so that the pockets 4 can be seen.

Further, the cage 6 has windows 18 the number of which corresponds to the number of rollers 3. The window 18 extends through the cage in the radial direction, but, in the axial direction, both an end of the window near the flange portion 17 and an end 19 remote from the flange portion 17 are closed. In the circumferential direction, a width of the window is smaller than a diameter of the roller. That is to say, the roller 3 is seated in a substantially rectangular window 18 encircled at its four sides, thereby preventing the roller 3 from being dislodged in the inner diameter direction. To show a relationship between the window 18 and the roller 3, in FIG. 1, the end 19 of the uppermost window 18 is broken away.

As shown in FIGS. 2 and 3, an inner diameter portion of an axial one end face 21 of the outer race 1 is provided with an annular stepped portion 13 with which the flange portion 17 of the cage 6 is engaged. An axial depth of the stepped portion 13 is slightly greater than a thickness of the flange portion 17 so that, when the flange portion 17 is fitted in the stepped portion 13, a clearance is generated between the axial end face 21 of the outer race 1 and the axial end face of the flange portion 17. Thus, the cage 6 can be rotated relative to the outer race 1 and the cage 6 can be prevented from being dislodged in the axial direction.

One end i.e. tab 15 of the spring 5 is secured to an axial end face 22 of the outer race 1 by welding as shown in FIG. 1, and the other end i.e. tab 16 of the spring is pinched between an axial end face of the roller 3 and the flange portion 17 of the cage 6 as shown in FIG. 3. With such an arrangement, the spring 5 itself is fixedly supported with respect to the outer race 1, so that the dislodgement of the spring 5 can be prevented, and, at the same time, the roller 3 can be prevented from being dislodged in the axial direction.

Figure 5:
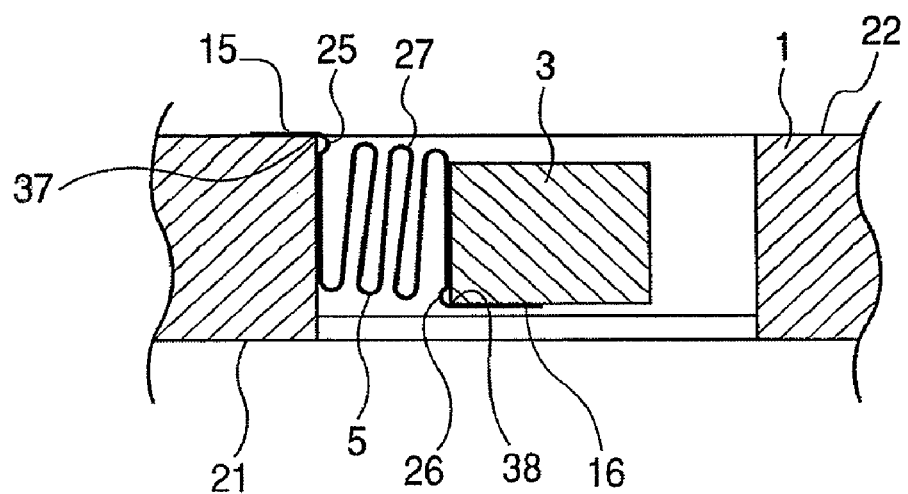
FIG. 5 is an enlarged sectional view of a pocket of the one-way clutch of roller type according to the embodiment of the present invention, taken along the line 5-5 of FIG. 4.

In the illustrated embodiment, as shown in FIGS. 1 and 5, the end 15 of the spring 5 is secured to the outer race 1 by spot welding. Two spot welded portions 36 are provided on the end 15. However, the securing of the end can be achieved by another way including welding, adhesive, soldering or the like, for example.

Figure 4:
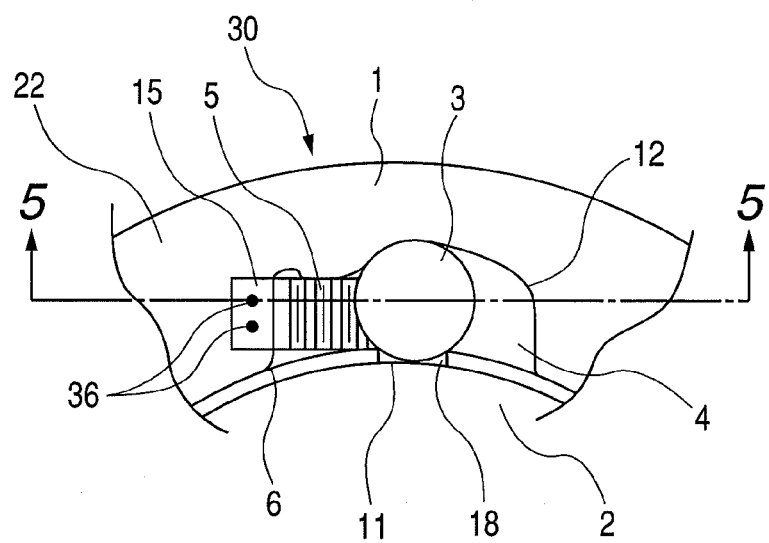
FIG. 4 is an enlarged partial front view showing a pocket and therearound of FIG. 1.

FIG. 4 is an enlarged partial front view showing the pocket 4 of FIG. 1 and therearound. Unlike to FIG. 1, FIG. 4 shows the one-way clutch 30 in an unlocked condition in which the roller 3 is disengaged from the cam surface 12.

Figure 6:
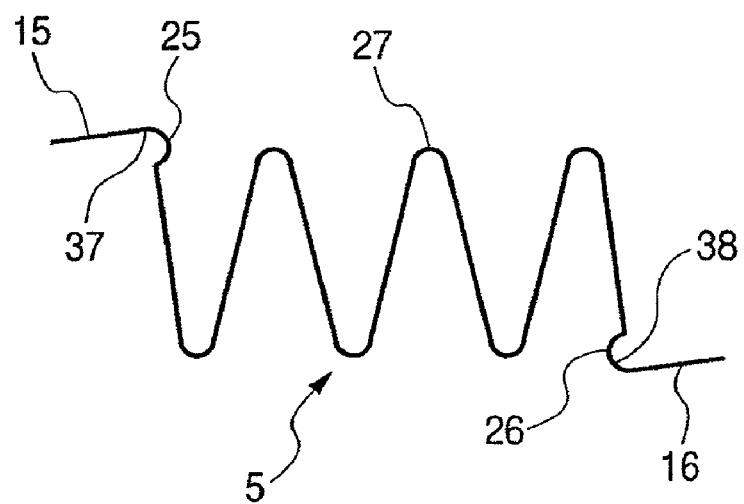
FIG. 6 is an enlarged front view of a spring of the one-way clutch of roller type according to the embodiment of the present invention.

FIG. 5 is an enlarged sectional view of the pocket 4 of FIG. 4, taken along the lone 5-5 of FIG. 4, and FIG. 6 is an enlarged sectional view of the spring 5 of the illustrated embodiment.

As shown in FIG. 6, the one end of the spring 5 secured to the axial end face 22 of the outer race 1 by the spot welding is formed as a tab portion 15 integrally connected to a bellows-shaped main body portion 27 via a bent portion 25 bent at a substantially right angle from the main body portion 27. On the other hand, the other end of the spring is similarly formed as a tab portion 16 integrally connected to the main body portion 27 via a bent portion 26 bent at a substantially right angle from the main body portion 27. Incidentally, FIG. 6 shows a condition that the spring 5 is almost not subjected to any load.

As shown in FIGS. 1 and 5, the tab portion 15 is secured to the axial end face 22 of the outer race 1 by the spot welding. On the other hand, as shown in FIGS. 3 and 5, the tab portion 16 is pinched between the axial end face of the roller 3 and the flange portion 17 of the cage 6.

With such an arrangement, the spring 5 itself is fixedly supported with respect to the outer race 1, so that the dislodgement of the spring 5 can be prevented, and, at the same time, the roller 3 can be prevented from being dislodged in the axial direction.

Further, as shown in FIG. 6 in detail, the bent portions 25 and 26 are provided with interference preventing portions i.e. curved portions 37 and 38 curved outwardly, respectively. As shown, spaces are formed within the curved portions 37 and 38. As can be seen from FIG. 5 showing a condition that the spring 5 is subjected to a load, due to the presence of such spaces, a predetermined clearance is generated between the curved portion 37 and a circumferential edge portion of the outer race 1. Further, a predetermined clearance is generated between the curved portion 38 and a circumferential edge portion of the roller 3. In this way, the bent portions 25 and 26 of the spring 5 can be prevented from abutting against the outer race 1 and the roller 3 to interfere therewith, respectively.

So long as the curved portions 37 and 38 have arrangement that they do not abut against the outer race 1 and the roller 3 to avoid the interference therewith, the curved portions may have any configurations. For example, the curved portion may have an outwardly protruding rectangular configuration.

By providing the bent portions 25 and 26 in this way, during the operation of the one-way clutch 30, the bent portions do not contact with the outer race 1 and/or the roller 3 not to be subjected to unnecessary force, with the result that the bent portions can be prevented from being damaged due to fatigue or being prematurely damaged due to wear and a smooth movement of the roller can be prevented from being obstructed.

The bent portions 25 and 26 can be formed integrally with the main body portion 27 by press working so that the bent portions are contiguous to the main body portion 27.

While the present invention has been described with reference to the exemplary embodiment, it is to be understood that the invention is not limited to the disclosed exemplary embodiment. The scope of the following claims is to be accorded the broadest interpretation so as to encompass all such modifications and equivalent structures and functions.

What is claimed is:

1. A one-way clutch comprising:
   an outer race provided at its inner periphery with at least one pocket including a cam surface and having a stepped portion formed on an inner diameter side of an axial end of said outer race;
   an inner race spaced radially inward from said outer race and coaxially arranged therewith for a relative rotational movement;
   a roller disposed in said pocket and adapted to transmit torque between said outer race and said inner race when engaged by said cam surface;
   a cage rotatable relative to said outer race and having a cylindrical portion with a window and a flange portion extending from said cylindrical portion toward an outer diameter direction and fitted in said stepped portion of said outer race, the window having a circumferential window width smaller than a diameter of said roller and adapted to hold said roller; and
   a spring disposed in said pocket and adapted to bias said roller in an engagement direction with respect to said cam surface,
   wherein one end of said spring is secured to said outer race and another end of said spring is engaged by said roller, and said one end and said another end are connected to a main body portion of said spring via first and second bent portions, respectively, and said bent portions are provided with interference preventing portions for preventing said bent portions from interfering with said outer race and said roller, respectively, one of said interference preventing portions forming a first clearance between said first bent portion and a circumferential end surface of said pocket of the outer race, and another of said interference preventing portions forming a second clearance between said second bent portion and a circumferential surface of the roller.

2. A one-way clutch according to claim 1, wherein said spring is constituted by an accordion spring and said main body portion has a bellows-shaped configuration, said one interference preventing portion is constituted by a curved portion curved outwardly from said circumferential end surface of said pocket, and said another interference preventing portion is constituted by a curved portion curved outwardly from said circumferential surface of the roller.

3. A one-way clutch according to claim 1, wherein said spring is arranged between said outer race and said roller.

4. A one-way clutch according to claim 1, wherein said first clearance is near an axial end surface of the outer race, and said second clearance is near an axial end surface of the roller.

5. A one-way clutch comprising:
- an outer race provided at its inner periphery with at least one pocket including a cam surface;
- an inner race spaced radially inward from said outer race and coaxially arranged therewith for relative rotation;
- a roller disposed in said pocket and adapted to transmit torque between said outer race and said inner race when engaged by said cam surface;
- a cage rotatable relative to said outer race and having a cylindrical portion with a window, the window having a circumferential window width smaller than a diameter of said roller and adapted to hold said roller; and
- a spring disposed in said pocket and adapted to bias said roller in an engagement direction with respect to said cam surface, said spring having a main body portion and first and second tab portions connected, respectively, to first and second end portions of said main body portion via respective first and second bent portions, wherein said first tab portion is in contact with an axial end surface of said outer race with said first end portion being in contact with a circumferential end surface of said pocket of said outer race and said second tab portion is in contact with an axial end surface of said roller with said second end portion being in contact with a circumferential surface of said roller, and wherein said first bent portion is configured so as not to abut with said circumferential end surface of said pocket, and said second bent portion is configured so as not to abut with said circumferential surface of said roller.

6. A one-way clutch according to claim 5, wherein said first bent portion forms a first clearance with respect to said circumferential end surface of said pocket, and said second bent portion forms a second clearance with respect to said circumferential surface of said roller.

7. A one-way clutch according to claim 6, wherein said first clearance is near an axial end surface of the outer race, and said second clearance is near an axial end surface of the roller.

* * * * *